(12) United States Patent
Nowak et al.

(10) Patent No.: US 8,825,764 B2
(45) Date of Patent: Sep. 2, 2014

(54) DETERMINING USER PERSONALITY CHARACTERISTICS FROM SOCIAL NETWORKING SYSTEM COMMUNICATIONS AND CHARACTERISTICS

(75) Inventors: Michael Nowak, San Francisco, CA (US); Dean Eckles, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 185 days.

(21) Appl. No.: 13/608,943

(22) Filed: Sep. 10, 2012

(65) Prior Publication Data
US 2014/0074920 A1    Mar. 13, 2014

(51) Int. Cl.
*G06F 15/16*    (2006.01)

(52) U.S. Cl.
CPC .................... *G06F 15/16* (2013.01)
USPC ....................................... 709/204

(58) Field of Classification Search
CPC ... G06Q 30/00; G06Q 30/0241; G06Q 50/01; G06Q 10/10; G06F 17/30867; G06N 5/043
USPC ....................................... 709/204
See application file for complete search history.

(56) References Cited

U.S. PATENT DOCUMENTS

| | | | |
|---|---|---|---|
| 2011/0055098 A1* | 3/2011 | Stewart | 705/321 |
| 2012/0102050 A1* | 4/2012 | Button et al. | 707/749 |
| 2012/0166520 A1* | 6/2012 | Lindsay et al. | 709/203 |
| 2012/0254333 A1* | 10/2012 | Chandramouli et al. | 709/206 |
| 2013/0013667 A1* | 1/2013 | Serena | 709/203 |
| 2013/0174055 A1* | 7/2013 | Johnson et al. | 715/753 |

FOREIGN PATENT DOCUMENTS

WO    WO 2011000046 A1 *    1/2011

OTHER PUBLICATIONS

Mislove, A. et al., "You Are Who You Know: Inferring User Profiles in Online Social Networks," *Proceedings of the Third ACM International Conference on Web Search and Data Mining*, Feb. 4-6, 2010, pp. 251-260, New York, New York, USA.

\* cited by examiner

*Primary Examiner* — Kostas Katsikis
(74) *Attorney, Agent, or Firm* — Fenwick & West LLP

(57) ABSTRACT

A social networking system obtains linguistic data from a user's text communications on the social networking system. For example, occurrences of words in various types of communications by the user in the social networking system are determined. The linguistic data and non-linguistic data associated with the user are used in a trained model to predict one or more personality characteristics for the user. The inferred personality characteristics are stored in connection with the user's profile, and may be used for targeting, ranking, selecting versions of products, and various other purposes.

14 Claims, 2 Drawing Sheets

DETERMINING USER PERSONALITY CHARACTERISTICS FROM SOCIAL NETWORKING SYSTEM COMMUNICATIONS AND CHARACTERISTICS

BACKGROUND

Embodiments of the present disclosure relate generally to social networking and, more specifically, to determining users' personality characteristics based on their communications in connection with the social networking system.

Social networks, or social utilities that track and enable connections between users (including people, businesses, and other entities), have become prevalent in recent years. In particular, a social networking system allows users to more efficiently communicate information that is relevant to their friends or other connections in the social network. Social networks typically incorporate a system for maintaining connections among users in the social network and links to content that are likely to be relevant to the users. Social networks also collect and maintain information about the users of the social network. This information may be static, such as geographic location, employer, job type, age, music preferences, interests, and a variety of other attributes, or it may be dynamic, such as tracking a user's actions within the social network. This information can then be used to target information delivery so that information more likely to be of particular interest to a user can be communicated to that user.

Typical social networking systems select content for a user based on information provided by the user and stored in a user profile and/or based on actions performed by the user and logged by the social networking system. Additional information about other users connected to the user may be used to further refine content selection. However, a user's personality also affects how the user interprets event or content and provides insights into how the user will react to new content or to context changes. Although user personality may be inferred based on user interactions with online communication channels, conventional social networking systems do not attempt to infer user personality characteristics from user interactions with the social networking systems.

SUMMARY

A social networking system obtains linguistic data from text communications generated by the user as well as characteristics of the user maintained by the social networking system. Based on the linguistic data and the characteristics, the social networking system predicts one or more personality characteristics of the user. The inferred personality characteristics are stored in a user profile for the user and then used to select content for presentation to the user.

Linguistic data is extracted from one or more of a plurality of types of communications between the user and one or more additional users of the social networking system. Types of communications may include status updates, notes, messages, posts, comments, or any other communications from which linguistic data may be extracted, and the communication may occur within the social networking system or outside of it and then provided to the social networking system. Because different types of communications are presented to different groups of users, extracting linguistic data from a variety of types of communications better enables the linguistic data to identify personality characteristics of the user. The linguistic data may indicate a percentage of words, or word stems, from the communications between the users and one or more additional users that are in various categories.

In addition to linguistic data, one or more characteristics of the user are retrieved from a user profile associated with the user. Examples of characteristics include: an age, a gender, a number of additional users connected to the user, a percentage of connections to other users initiated by the user, a presence of a profile picture in the user profile, a number of times the user accesses the social networking system within a specified time interval, a number of communications from the user having different communication types, a frequency with which the user creates different communication types, a total number of communications generated by the user, a percentage of communications generated by the user having different types of communication, and a number of unique days the user generated communications having various types of communication. One or more models are applied to the linguistic data and the one or more characteristics to identify personality characteristics associated with, or likely to be associated with, the user. Examples of personality characteristics include: extroversion, agreeableness, conscientiousness, emotional stability, and openness.

The identified personality characteristics are stored in the user's user profile and are used to select content for presentation to the user. For example, the identified personality characteristics may be used along with other information to select news stories, advertisements, or recommendations of actions presented to the user. By using personality characteristics when selecting content, the social networking system increases the likelihood that the user will favorably interact with the selected content.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
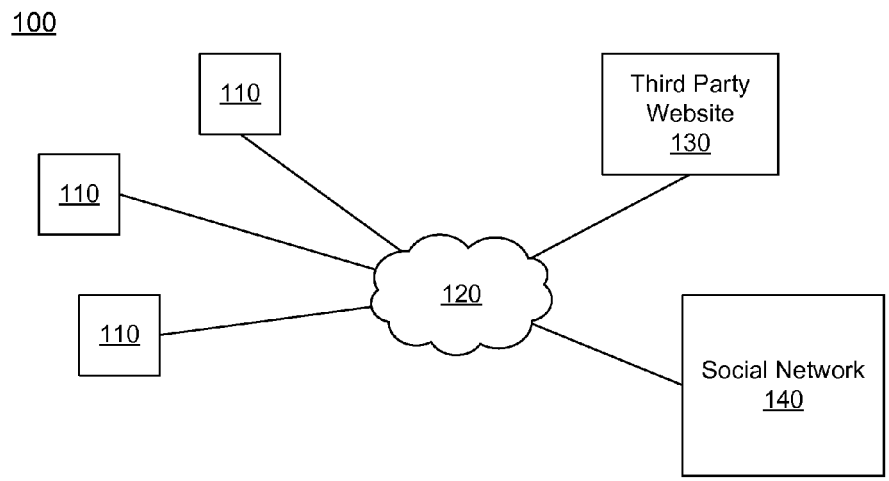
FIG. 1 is a block diagram of a system environment in which a social networking system operates, in accordance with an embodiment of the invention.

FIG. 1 is a high level block diagram illustrating a system environment 100 for a social networking system 140. The system environment 100 comprises one or more client devices 110, a network 120, one or more third-party websites 130 and the social networking system 140. In alternative configurations, different and/or additional components may be included in the system environment 100. The embodiments described herein can be adapted to online systems that are not social networking systems.

The client devices 110 comprise one or more computing devices capable of receiving user input as well as transmitting and/or receiving data via the network 120. In one embodiment, a client device 110 is a conventional computer system, such as a desktop or laptop computer. In another embodiment, a client device 110 may be a device having computer functionality, such as a personal digital assistant (PDA), mobile telephone, smart-phone or similar device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) that runs on the native operating system of the client device 110, such as IOS® or ANDROID™.

The client devices 110 are configured to communicate via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, CDMA, digital subscriber line (DSL), etc. Similarly, the networking protocols used on the network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 130 may be coupled to the network 120 for communicating with the social networking system 140, which is further described below in conjunction with FIG. 2.

Figure 2:
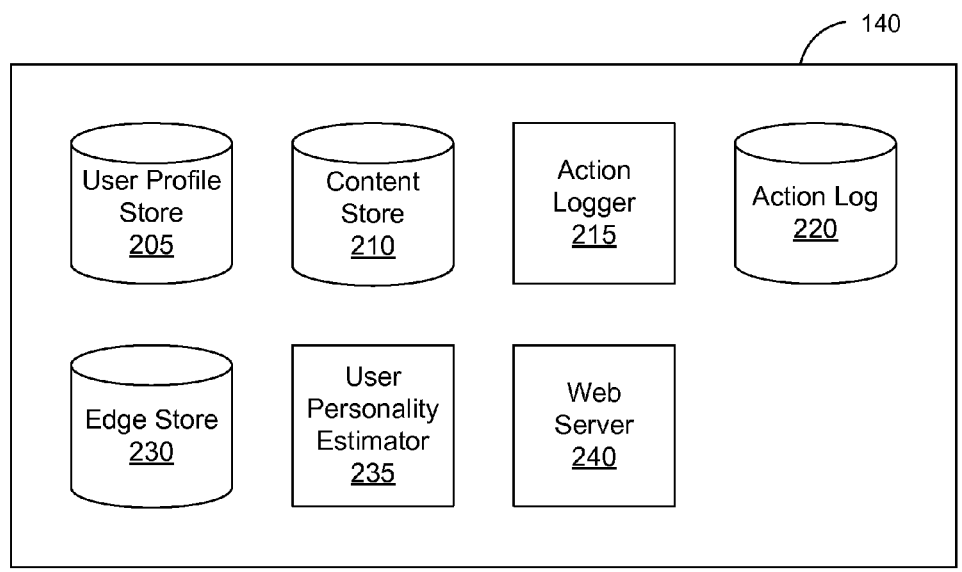
FIG. 2 is a block diagram of a social networking system, in accordance with an embodiment of the invention.

FIG. 2 is an example block diagram of an architecture of the social networking system 140. The social networking system 140 includes a user profile store 205, a content store 210, an action logger 215, an action log 220, an edge store 230, a user personality estimator 235, and a web server 240. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on content items in the content store 210 and stored in the action log 220.

While user profiles in the user profile store 205 are frequently associated with individuals, allowing people to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 140, such as status updates, photos tagged by users to be associated with other objects in the social networking system, events, groups or applications. In some embodiments, objects are received from third-party applications or third-party applications separate from the social networking system 140. Content "items" represent single pieces of content that are represented as objects in the social networking system 140. Users of the social networking system 140 are encouraged to communicate with each other by posting text and content items of various types of media through various communication channels, increasing the interaction of users with each other and increasing the frequency with which users interact within the social networking system.

Social networking system users transmit text content to each other using a variety of communication types. The text content is stored in the content store 210 and associated with the user sending the text content and the one or more users receiving the text content. A communication type may be associated with the stored text content. Examples of communication types include status updates, notes, comments, posts and messages. A status update is text data provided by a user that is included in the user's user profile and as stories in news feeds presented to other users connected to the user. Similarly, a note is longer or more detailed text data provided by the user that is included in the user's user profile and as stories in news feeds presented to other users connected to the user. A post is text that a user places on a profile of an additional user connected to the user; a post is typically visible to users connected to the user and/or users connected to the additional user. Comments are data posted based on previously posted content, such as status updates, notes or actions previously taken by a user. Messages are text sent from a user to another user; messages are visible to the user sending the message and the user receiving the message.

Communication types differ from each other in a variety of ways. For example, messages have smaller, more carefully chosen audiences than status updates. As another example, notes are typically longer than other communication types. These differences allow messages having different communication types to provide different information about personality characteristics of users.

The action logger 215 receives communications about user actions on and/or off the social networking system 140, populating the action log 220 with information about user actions. Such actions may include, for example, adding a connection to another user, sending a message to another user, uploading an image, reading a message from another user, viewing content associated with another user, attending an event posted by another user, among others. In some embodiments, the action logger 215 identifies interaction between a social networking system user and a brand page within the social networking system 140, which communicates targeting criteria associated with content on the brand page to a content selector to customize content from the brand page. In addition, a number of actions described in connection with other objects are directed at particular users, so these actions are associated with those users as well. These actions are stored in the action log 220.

The action log 220 may be used by the social networking system 140 to track user actions on the social networking system 140, as well as external website that communicate information to the social networking system 140. Users may interact with various objects on the social networking system 140, including commenting on posts, sharing links, and checking-in to physical locations via a mobile device, accessing content items or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140 as well as other applications operating on the social networking system 140. In some embodiments, data from the action log 220 is used to infer interests or preferences of the user, augmenting the interests included in the user profile and allowing a more complete understanding of user preferences.

The action log 220 may also store user actions taken on external websites. For example, an e-commerce website that primarily sells sporting equipment at bargain prices may recognize a user of a social networking system 140 through social plug-ins that enable the e-commerce website to identify the user of the social networking system 140. Because users of the social networking system 140 are uniquely identifiable, e-commerce websites, such as this sporting equipment retailer, may use the information about these users as they visit their websites. The action log 220 records data about these users, including webpage viewing histories, advertisements that were engaged, purchases made, and other patterns from shopping and buying.

In one embodiment, an edge store 230 stores the information describing connections between users and other objects on the social networking system 140 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other users of the social networking system, and commenting on posts made by other users of the social networking system.

The edge store 230 stores edge objects that include information about the edge, such as affinity scores for objects, interests, and other users. Affinity scores may be computed by the social networking system 140 over time to approximate a user's affinity for an object, interest, and other users in the social networking system 140 based on the actions performed by the user. A user's affinity may be computed by the social networking system 140 over time to approximate a user's affinity for an object, interest, and other users in the social networking system 140 based on the actions performed by the user. Computation of affinity is further described in U.S. patent application Ser. No. 12/978,265, filed on Dec. 23, 2010, which is hereby incorporated by reference in its entirety. Multiple interactions between a user and a specific object may be stored in one edge object in the edge store 230, in one embodiment. In some embodiments, connections between users may be stored in the user profile store 205, or the user profile store 205 may access the edge store 230 to determine connections between users.

The user personality estimator 235 determines one or more personality characteristics of a user based on textual content generated by the user from the content store 210 and information from the user profile store 205. Linguistic data associated with the user is determined by analyzing text content generated by the user. This allows the user personality estimator 235 to account for the different audiences and information included in messages having different communication types. To maximize the amount of linguistic data associated with the user, messages associated with multiple communication types are retrieved from the content store 210 and analyzed. In one embodiment, the user personality estimator 235 determines a count of words or word stems in the retrieved messages that are in a plurality of categories. For example, the user personality estimator 235 determines the number of word stems, such as pronouns, emotion words, and words related to specific categories, in messages associated with the user that are in categories of the Linguistic Inquiry and Word Count (LIWC) data set; however, any suitable dictionary may be used in various embodiments. As another example, one or more matrices are constructed based on unigram or n-gram counts obtained from the messages associated with the user.

One or more models are applied to the linguistic data and to the data retrieved from the user profile for the user personality estimator 235 to determine one or more personality characteristics of the user. For example, an elastic net combining L1 and L2 penalties is applied to the linguistic data and the information from the user profile for the user to determine a likelihood that the user has one or more personality characteristics. Examples of personality characteristics include extroversion, agreeableness, conscientiousness, emotional stability and openness; however, other personality characteristics may be determined. One or more of the models applied by the user personality estimator 235 may be trained based on data received from a training group of users based on survey information including questions about personality characteristics. One or more personality characteristics determined for the user are stored in the user's user profile and may subsequently be used for selection of content presented to the user. The user personality estimator 235 is further described below in conjunction with FIG. 3.

The web server 240 links the social networking system 140 via the network 120 to the one or more client devices 110, as well as to the one or more third party websites 130. The web server 240 serves web pages, as well as other web-related content, such as Java, Flash, XML and so forth. The web server 240 may provide the functionality of receiving and routing messages between the social networking system 140 and the client device 110, for example, instant messages, queued messages (e.g., email), text and SMS (short message service) messages, or messages sent using any other suitable messaging technique. A user may send a request to the web server 240 to upload information, for example, images or videos that are stored in the content store 210. Additionally, the web server 240 may provide API functionality to send data directly to native client device operating systems, such as IOS®, ANDROID™, WEBOS® or RIM.

Determining Social Networking System User Personality Characteristics

Figure 3:
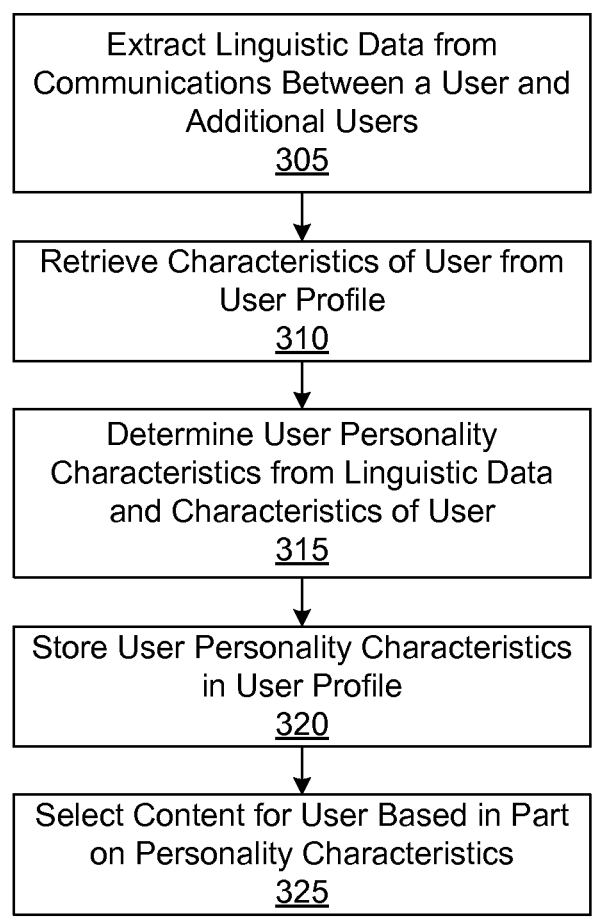
FIG. 3 shows a flow chart of one embodiment of a method for determining user personality characteristics, in accordance with an embodiment of the invention.

FIG. 3 shows a flow chart of one embodiment of a method 300 for method for determining social networking system user personality characteristics. In one embodiment, the user personality estimator 235 identifies a user of a social networking system 140 and retrieves text communications generated by the user from a content store 210. For example, the user personality estimator 235 retrieves text content generated by the user and having one or more communication types from the content store 210. As described above in conjunction with FIG. 2, examples of communication types include status updates, notes, comments, posts and messages. Retrieving a plurality of communication types associated with the user allows the user personality estimator 235 to increase the amount of linguistic data for the user and to account for the different audiences for the different communication types. The retrieved content may be limited to content generated within a particular time range, such as a year or multiple months.

The user personality estimator 235 extracts 305 linguistic data from the retrieved communications. For example, the user personality estimator 235 determines a count of words or word stems in the retrieved messages that are in a plurality of categories. For example, the user personality estimator 235 determines the number of word stems, such as pronouns, emotion words, and words related to specific categories, in messages associated with the user that are in categories of the Linguistic Inquiry and Word Count (LIWC) data set; however, any other suitable data set or combination of data sets may be used. The number of word stems in each of the categories may be used as the linguistic data for the user. For example, the number of word stems in each category and the total word stem count may be used to determine proportions of word stems matching various categories. As another example, one or more matrices are constructed based on features determined from unigram or n-gram counts obtained from the retrieved text content associated with the user.

In some embodiments, the text content associated with the user may be pre-processed to improve linguistic data extraction. For example, proportions of word stems in each category or proportions of each word out of the total number of word stems or words included in the retrieved text content are determined. Proportions for categories may be replaced by fitted values derived from a logistic regression where category, user and user-category pair are provided as random effects predicting proportions. Alternatively, the user personality estimator 235 may perform topic modeling, such as latent Dirichlet allocation, to the linguistic data from the retrieved communications to allow inference of personality characteristics from the linguistic data without preprocessing.

The user personality estimator 235 retrieves 310 characteristics of the user from the corresponding user profile in the user profile store 205. Examples of characteristics retrieved 310 from the user profile include: age, gender, number of additional users connected to the user, percentage of connections to other users initiated by the user, presence of a profile picture in the user profile, number of times the user accesses the social networking system 140 within a specified time interval, number of communications from the user having different communication types, frequency with which the user creates different communication types, total number of communications generated by the user, percentage of communications generated by the user having different communication types and number of unique days the user generated text content having various communication types. However, any suitable characteristics may be retrieved 310 from the user profile.

Based on the extracted linguistic data and the retrieved characteristics, one or models implemented by the user personality estimator 235 determine 315 personality characteristics of the user. In one embodiment, statistical models are applied to the linguistic data and the retrieved characteristics to determine 315 levels the user has of personality characteristics selected from a set of personality characteristics. For example, the statistical models determine 315 levels the user has of one or more of extraversion, agreeableness, conscientiousness, emotional stability and openness as personality characteristics. In one embodiment, a Spearman rank correlation analysis of the linguistic data is performed, allowing correlations between personality characteristics and word stem category proportions from the text content generated by the user to identify likely personality characteristics. One or more models may also augment the rank correlation analysis of linguistic data with one or more of the characteristics retrieved 310 from the user profile. In one embodiment, an elastic net combining L1 and L2 penalties is applied to the linguistic data and the retrieved characteristics.

One or more of the models used by the user personality estimator 235 may be trained based on information received from a set of training users. For example, the user personality estimator 235 sends a survey to users in the set of training users and responses received from the training set of users provide information about user personality characteristics. In one embodiment, the survey includes two items associated with different personality characteristics and prompts users in the training set to agree or disagree with the application of two adjectives to the users by selecting from a group of responses. Each response may be assigned a value and the values for each personality characteristic are used to determine personality characteristics of users in the training set. After determining personality characteristics of users in the training set, text content generated by each user in the training set and characteristics associated with each user in the training set are analyzed, with the resulting communication behavior indicating characteristics and linguistic data for users having various personality characteristics.

Based on correlations between personality characteristics and combinations of linguistic features and the retrieved characteristics, the user personality estimator 235 identifies one or more personality characteristics the user is likely to have. For example, personality characteristics associated with at least a threshold value by one or more models are associated with the user. In some embodiments, one or more models used by the user personality estimator 235 account for information about other users connected to the user when determining 315 levels of personality characteristics associated with the user. For example, a model accounts for content from one or more other users to which text data from the user responds when using linguistic data to determine 315 personality characteristics of the user. As another example, overlap in word usage between the user and other users connected to the user is a factor in determination of the user's personality characteristics. Any other suitable information about other users of the social networking system may be included in one or more models to determine 315 levels of personality characteristics for the user.

The one or more personality characteristics determined 315 by the user personality estimator are stored 320 in the user profile associated with the user. In one embodiment, the user personality estimator 235 identifies a probability distribution of personality characteristics the user is likely to have from the linguistic features and the retrieved characteristics, and the probability distribution of personality characteristics is stored 320 in the user profile of the user. Storing the distribution of personality characteristics allows the social networking system 140 to account for uncertainty in determination of the user's personality characteristics by storing 320 levels of personality characteristics that the user is likely to have as well as storing 320 alternative levels of personality characteristics that the user may have.

The social networking system 140 uses the personality characteristics associated with the user to select 325 additional content for the user. For example, a user's personality characteristics may be used along with other user information, such as affinities, to select stories for inclusion in the user's newsfeed, to select advertisements for presentation to the user, or to select recommendations of actions for the user to perform with the social networking system 140. As another example, stored personality characteristics may be used as targeting criteria for advertisers, allowing advertisement selection to account for particular personality characteristics to increase the likelihood that the user accesses or otherwise positively interacts with a selected advertisement. For example, the product presented in an advertisement may be modified based on one or more of the personality characteristics stored in the user profile.

Additionally, personality characteristics associated with the user may be used to select 325 content for other users of the social networking system 140. For example, the user's personality characteristics may be used to determine whether content associated with the user is distributed to other users connected to the user. In one embodiment, the user's personality characteristics may be used to determine whether stories describing actions by the user are included in a news feed of another user or used to determine the location of a story describing an action by the user in the other user's news feed. As another example, the user's personality characteristics may be used when selecting suggested actions for other users that involve the user; as a specific example, the user's personality characteristics may be used to determine whether to recommend that an additional user establish a connection with the user in the social networking system 140.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing a survey to a training set including a plurality of users of a social networking system, the survey including a plurality of items associated with one or more personality characteristics;
receiving responses to the survey from responding users in the training set;
determining one or more personality characteristics associated with each of the responding users based on the received responses;
extracting linguistic data from text content retrieved from the social networking system generated by the responding users;
retrieving characteristics associated with the responding users from user profiles from the social networking system associated with the responding users, wherein the characteristics associated with the responding users are selected from a group consisting of: an age, a gender, a number of additional users connected to the user, a percentage of connections to other users initiated by the user, a presence of a profile picture in the user profile, a number of times the user accesses the social networking system within a specified time interval, a number of communications from the user having different communication types, a frequency with which the user creates different communication types, total number of communications generated by the user, a percentage of communications generated by the user having different types of communication, a number of unique days the user generated communications having various types of communication, and any combination thereof;

for each of at least a subset of the responding users, associating linguistic data based on text content generated by the responding user and characteristics associated with the responding user with one or more personality characteristics associated with the responding user; and generating a model determining one or more personality characteristics of a user based on linguistic data associated with the user and characteristics associated with the user based on the associating.

2. The computer-implemented method of claim 1, wherein the one or more personality characteristics are selected from a group consisting of: extroversion, agreeableness, conscientiousness, emotional stability, openness, and any combination thereof.

3. The computer-implemented method of claim 1, further comprising:
   extracting linguistic data from a plurality of types of text communications between the user and one or more additional users of the social networking system;
   retrieving one or more characteristics of the user from a user profile maintained by the social networking system and associated with the user;
   applying the generated model to the extracted linguistic data and the retrieved one or more characteristics of the user;
   storing the one or more personality characteristics determined by the generated model in the user profile associated with the user; and
   presenting content to the user based at least in part on the determined one or more personality characteristics of the user.

4. The computer-implemented method of claim 3, wherein presenting content to the user based at least in part on the determined one or more personality characteristics of the user comprises:
   selecting one or more stories for inclusion in a news feed presented to the user based at least in part on the determined one or more personality characteristics of the user; and
   presenting the selected one or more stories to the user in the news feed.

5. The computer-implemented method of claim 3, wherein presenting content to the user based at least in part on the determined one or more personality characteristics of the user comprises:
   selecting one or more advertisements for presentation to the user based at least in part on the determined one or more personality characteristics of the user; and
   presenting the selected one or more advertisements to the user.

6. The computer-implemented method of claim 5, wherein selecting one or more advertisements for presentation to the user based at least in part on the determined one or more personality characteristics of the user comprises:
   selecting advertisements associated with one or more targeting criteria matching at least one of the determined personality characteristics of the user.

7. The computer-implemented method of claim 3, wherein presenting content to the user based at least in part on the determined one or more personality characteristics of the user comprises:
   selecting one or more recommendations for actions to the user based at least in part on the determined one or more personality characteristics of the user; and
   presenting the selected one or more recommendations for actions to the user.

8. A computer program product comprising a non-transitory computer-readable storage medium having stored thereon programming instructions which when executed by a processor perform a method to:
   provide a survey to a training set including a plurality of users of a social networking system, the survey including a plurality of items associated with one or more personality characteristics;
   receive responses to the survey from responding users in the training set;
   determine one or more personality characteristics associated with each of the responding users based on the received responses;
   extract linguistic data from text content retrieved from the social networking system generated by the responding users;
   retrieve characteristics associated with the responding users from user profiles from the social networking system associated with the responding users, wherein the characteristics associated with the responding users are selected from a group consisting of: an age, a gender, a number of additional users connected to the user, a percentage of connections to other users initiated by the user, a presence of a profile picture in the user profile, a number of times the user accesses the social networking system within a specified time interval, a number of communications from the user having different communication types, a frequency with which the user creates different communication types, total number of communications generated by the user, a percentage of communications generated by the user having different types of communication, a number of unique days the user generated communications having various types of communication, and any combination thereof;
   for each of at least a subset of the responding users, associate linguistic data based on text content generated by the responding user and characteristics associated with the responding user with one or more personality characteristics associated with the responding user; and
   generate a model determining one or more personality characteristics of a user based on linguistic data associated with the user and characteristics associated with the user based on the associating.

9. The computer program product of claim 8, wherein the one or more personality characteristics are selected from a group consisting of: extroversion, agreeableness, conscientiousness, emotional stability, openness, and any combination thereof.

10. The computer program product of claim 8, further comprising:
    extracting linguistic data from a plurality of types of text communications between the user and one or more additional users of the social networking system;
    retrieving one or more characteristics of the user from a user profile maintained by the social networking system and associated with the user;

applying the generated model to the extracted linguistic data and the retrieved one or more characteristics of the user;

storing the one or more personality characteristics determined by the generated model in the user profile associated with the user; and presenting content to the user based at least in part on the determined one or more personality characteristics of the user.

11. The computer program product of claim 10, wherein presenting content to the user based at least in part on the determined one or more personality characteristics of the user comprises:

selecting one or more stories for inclusion in a news feed presented to the user based at least in part on the determined one or more personality characteristics of the user; and presenting the selected one or more stories to the user in the news feed.

12. The computer program product of claim 10, wherein presenting content to the user based at least in part on the determined one or more personality characteristics of the user comprises:

selecting one or more advertisements for presentation to the user based at least in part on the determined one or more personality characteristics of the user; and presenting the selected one or more advertisements to the user.

13. The computer program product of claim 12, wherein selecting one or more advertisements for presentation to the user based at least in part on the determined one or more personality characteristics of the user comprises:

selecting advertisements associated with one or more targeting criteria matching at least one of the determined personality characteristics of the user.

14. The computer program product of claim 10, wherein presenting content to the user based at least in part on the determined one or more personality characteristics of the user comprises:

selecting one or more recommendations for actions to the user based at least in part on the determined one or more personality characteristics of the user; and presenting the selected one or more recommendations for actions to the user.

\* \* \* \* \*